(12) United States Patent
Keire

(10) Patent No.: US 6,382,120 B1
(45) Date of Patent: May 7, 2002

(54) SEAMED SAIL AND METHOD OF MANUFACTURE

(76) Inventor: Fred Aivars Keire, 108 Butternut Hollow Rd., Greenwich, CT (US) 06830

( * ) Notice: Subject to any disclaimer, the term of this patent is extended or adjusted under 35 U.S.C. 154(b) by 0 days.

(21) Appl. No.: 09/847,690

(22) Filed: May 2, 2001

(51) Int. Cl.[7] .................................................. B63H 9/04
(52) U.S. Cl. ............................ 114/102.29; 114/102.33
(58) Field of Search ...................... 114/102.1, 102.29, 114/102.31, 102.33; 428/109, 110, 113, 902; 442/2–4

(56) References Cited

U.S. PATENT DOCUMENTS

| | | | |
|---|---|---|---|
| 3,616,142 A | * 10/1971 | Schrotenboer | ............... 442/35 |
| 3,626,886 A | 12/1971 | Cafiero | |
| 3,903,826 A | 9/1975 | Andersen | |
| 3,954,076 A | 5/1976 | Fracker | |
| 4,309,824 A | 1/1982 | Fuchs | |
| 4,473,432 A | * 9/1984 | Leader et al. | ............ 156/380.6 |
| 4,476,799 A | 10/1984 | Bandy | |
| 4,593,639 A | 6/1986 | Conrad | |
| 4,672,907 A | 6/1987 | Smale | |
| 4,679,519 A | 7/1987 | Linville | |
| 4,708,080 A | 11/1987 | Conrad | |
| 4,945,848 A | 8/1990 | Linville | |
| 4,708,080 C1 | 9/1990 | Conrad | |
| 4,953,489 A | 9/1990 | Bassett | |
| 5,097,784 A | 3/1992 | Baudet | |
| 5,333,568 A | 8/1994 | Meldner et al. | |
| 5,355,820 A | 10/1994 | ConrAd et al. | |
| 5,403,641 A | 4/1995 | Linville et al. | |
| 6,112,689 A | 9/2000 | Baudet | |
| 6,257,160 B1 | * 7/2001 | Keire | ..................... 114/102.29 |
| 6,260,497 B1 | * 7/2001 | Keire | ..................... 114/102.29 |
| 6,311,633 B1 | * 11/2001 | Keire | ..................... 114/102.29 |

OTHER PUBLICATIONS

Peter Isler, "Faster, lighter, smoother high–tech sails" *Sailing World*, Jul./Aug. 1997, vol.XXXVI, No. 7, U.S.A. pp40–44.

Vigolo et al, "Macroscopic Fibers and Ribbons of Oriented Carbon Nanotubes", Science, Nov. 17,2000, vol. 290, USA, pp 1331–1334.

\* cited by examiner

*Primary Examiner*—Stephen Avila
(74) *Attorney, Agent, or Firm*—Fred A. Keire

(57) ABSTRACT

A seamed sail made from a full size precursor sail of yarn oriented load path specific type which is thereafter cut and seamed; a method for making the sail and an apparatus for it.

15 Claims, 11 Drawing Sheets

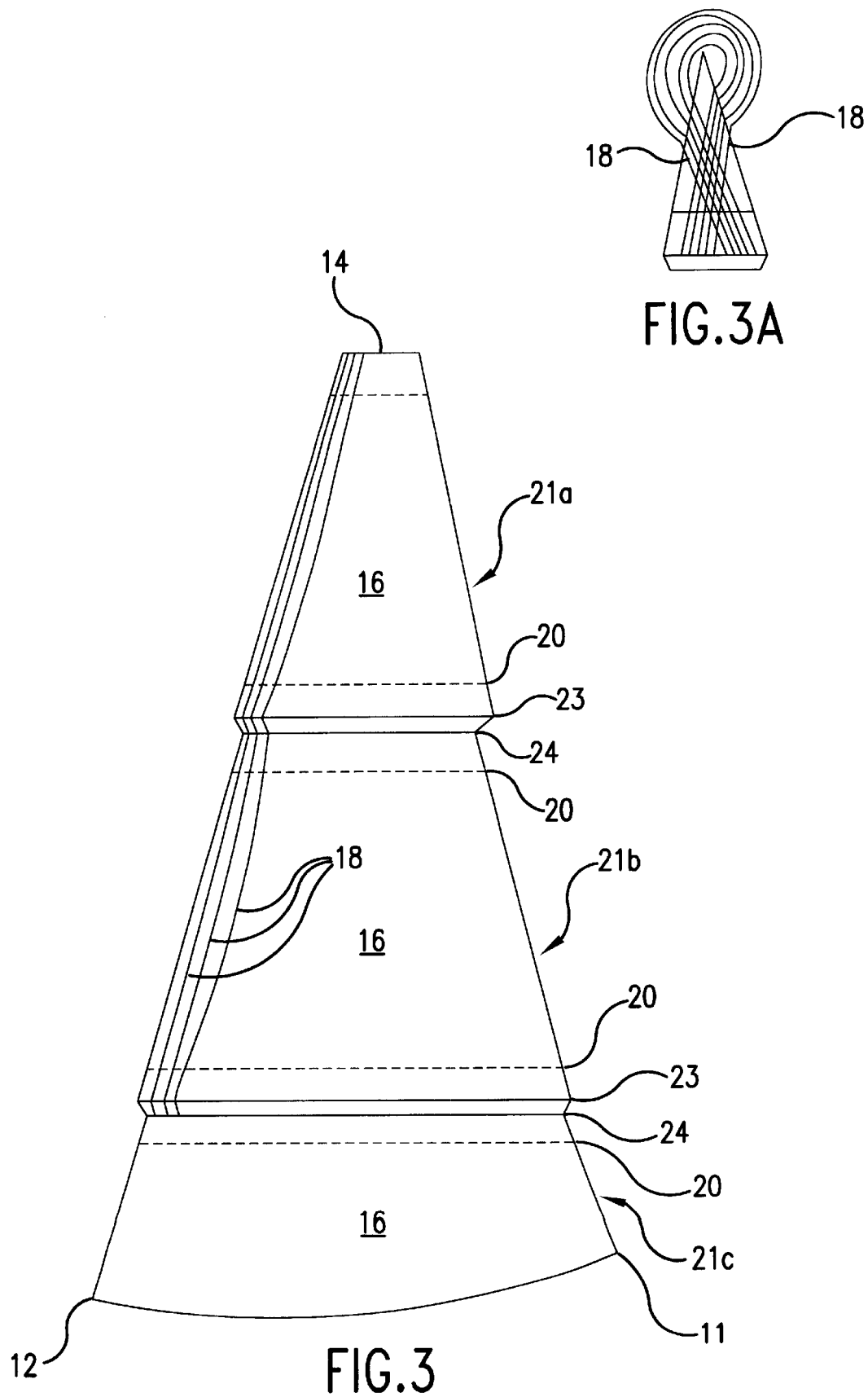

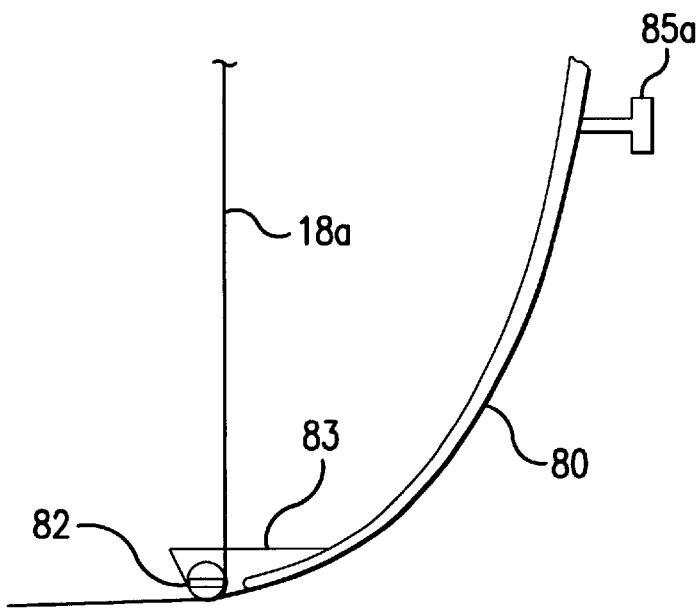
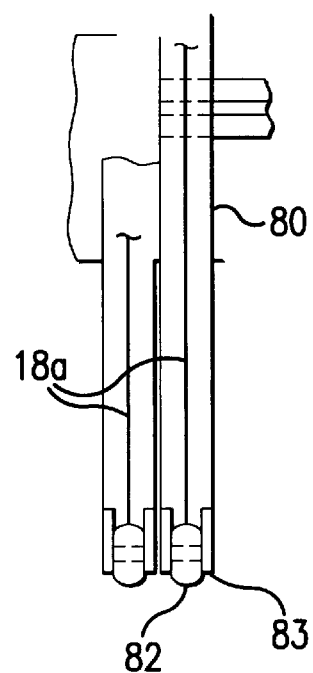
FIG.10A
FIG.10B
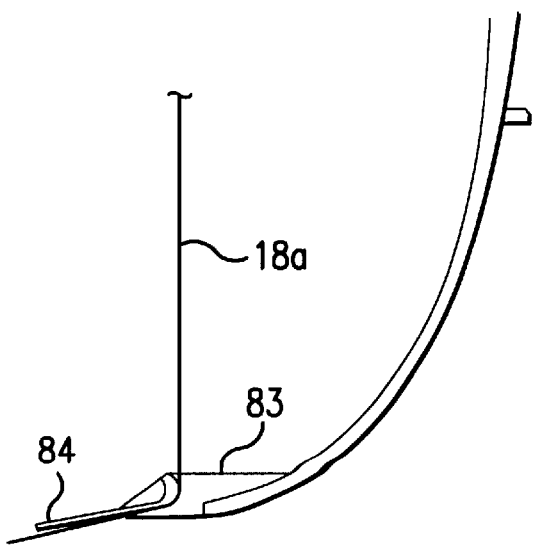
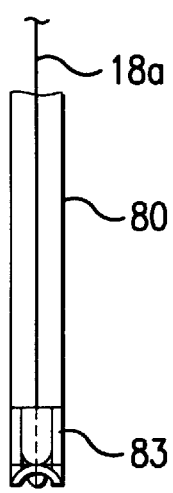
FIG.11A
FIG.11B

SEAMED SAIL AND METHOD OF MANUFACTURE

This invention relates to sails for sail driven vessels including sail assisted vessels; more particularly, this invention relates to novel sails, novel materials for sails, and the method for production of sail materials and sails. This application is related to my previously filed applications Ser. No. 09/520,246 and Ser. No. 09/521,446 filed on Mar. 7, 2000, and now U.S. Pat. Nos. 6,260,497 and 6,257,160, respectively and pending application Ser. No. 09/570,959 filed May 15, 2000 now U.S. Pat. No. 6,311,633.

BACKGROUND FOR THE INVENTION

In chronological order in the past century, sails have been made of woven textile materials. Base fibers for these textile materials were derived from natural polymers, i.e., cellulose, of which cotton and linen were preeminent. In general, the fibers in these textile yarns used for weaving sailcloth were of short length as it is typically found in natural polymers. However, significant advantage in sails was realized by longer length fibers and high quality sails were sold as being made of long length "Egyptian cotton" yarns.

With the advent of synthetic fibers, that is an extruded bundle of "continuous" filaments for yarns, the length of fibers in yarns became immaterial, as typically all yarns were a bundle of "mono" filament yarns of substantial "fiber" length. Chopped fiber yams or "spun yams" or "staple" were not used in sailcloth. Hence, the meaning of monofilament yarns, continuous filament fibers, and yarns became interchangeable for sail making purposes. However, besides the "fiber" length in yarns, a synthetic mono filament in a bundle of monofilaments as a yarn possessed many advantages such as initial modulus, tenacity, flex life, elongation at break, elongation resistance, resistance to creep, decay resistance, e.g., ultraviolet and mildew, weight-to-strength ration, etc. etc. These characteristics are for the modern filament yarns superior to the best cotton fabrics.

Accordingly, with the advent of continuous length filaments such as polyester and nylon (a polyamide), sailcloth are made of bundle of continuous filament materials called yarns. Today substantially entirely all sails in economically advanced countries are made of synthetic materials.

As new polymers were developed and as these lent themselves to filament formation and possessed the desirable properties for yarn formation, these materials found increasing use in sail making. For example, Kevlar™ (a polyaramid fiber sold by Dupont Co.) and Tawron™ (a polyaramid fiber sold by Akzo Co.) were used in sailcloth first with indifferent success, but as the fiber properties were improved such use became increasingly prevalent.

As new and improved derivatives of the above materials such as Kevlar 29™ and Kevlar 49™ and PEN polyesters (i.e., polyethylene naphtalate polymer) and entirely new synthetic polymers were developed with properties suitable for sail making, these materials found use in sails, albeit at a very high premium, over conventional polyester fabrics. Examples of such filament materials are: Vectran™ (a polyaramid type of fiber sold by Hoechst-Trevira Corporation), Spectra™, Dyneema™, Certran™ (a high modulus polyolefin filament sold by Allied Corp., DMS Company and Hoechst-Trevira Corporation respectively) and PBO (polyphenylene benzo bisoxazole) sold as Zylon™ by Toyoba Company. A considerable effort has also been expended to develop carbon fibers for sail making use, e.g., carbon fibers coated with a polyester or a polyamide polymer. Recently, macroscopic fibers and ribbons of oriented carbon nanotubes have been disclosed having excellent flexibility character (cf. Science, Vol. 290, Nov. 17, 2000, pp. 1331–1334.

In sail making, when evaluating the above and novel filaments, the following tests are used:

Initial modulus: a measure of the yarn's ability to resist stretch. It indicates how well the filaments will hold shape, and is measured in grams of load per unit of stretch for a given denier. The higher the number, the less the stretch. Also defined as the slope of the initial straight portion of the stress-strain curve.

Tenacity: The yarn's initial breaking strength, expressed in grams of force per denier. This is a good measure of a filaments ultimate strength. The higher the number, the more load it takes to break the filaments.

Flex life: A measure of the filament's ability to retain its strength after being folded back and forth. It is expressed as a percentage of the fabric's strength lost after 60 bend cycles.

UV resistance: Expressed as the amount of time it takes for a yarn to lose 50 percent of its modulus; normally conducted with artificial UV exposure.

Elongation to break: A measure of the filament's ability to resist shock loads. It is measured as how much such filaments will stretch (as a percentage of its overall length) before it breaks.

However, despite the advances in synthetic polymer technology, the inherent shortcomings associated with woven technology are evident, i.e., 90 degree warp and fill orientation and the over and under shape of the warp yarns caused by weaving called "crimp." These inherent shortcomings cause considerable problems associated with sail shape distortion. Shape distortion is caused by the anisotropic properties of the material when the force is applied at less than 90 degrees to the fill and/or warp orientation. It should be noted that typically sailcloth was woven with the better properties in the fill direction as the warp yarns, because of the "crimp" in the yarns, did not have the same elongation characteristics as the fill yarns. To remedy the inferior warp direction properties, "warp inserted" fabrics were also produced.

Within about the last 25 years considerable effort has been devoted to address the bias distortion in sails arising from the conventionally woven fabrics. This effort has had a three-prong approach. First, sailcloth manufacturers sought to improve the sailcloth by resin and heat treatment and resin applications. Additionally, sailcloth manufacturers added laminated films, typically a polyester film to the fabric on one, both sides, or in between two fabric layers. As the second approach, the sail makers employed panel orientation to align the fill threads or yarns with the load path, e.g., in tri-radial sails to minimize the bias inherent in a triangular sail typically used on recreational sailboats. Finally, as a third approach, sail makers devised structural sails (also known as fiber- or yarn-oriented sails) for racing; these were real "breakthrough" sails.

For structural sails, the initial development was to place the structure in the form of fabric strips, bundled monofilament fibers, i.e., yarns or yarns in the form of tapes on the skin or membrane of the sail. These added structures followed the load path in the sail. The load or stress maps for a sail had been available to sail makers for a number of years. The whole structure was typically confined either on one side or the other side or both sides of the sail. A subsequent development confined the structure between two layers of a film.

Bias distortion as used in the sailing parlance is typically caused by a load (also force or stress) that is "off-the-thread line." That is, if the warp (or ends) and the fill (or weft) yarns are in a line with the major, predominant load, sails are said to have the stress "on-the-thread" line," i.e., be less bias distorted. Typically, a sailcloth is woven with the fill threads under tension and therefore these do not suffer from the "crimp" of the warp threads. These fill threads are not as much subject to elongation as the warp threads when the sail is under load. However, in a typical sail there are other loads or forces "off-the-thread" line. By adding a laminated film to the material, typically a polyester film or a poly vinyledene chloride film (e.g. sold under a trademarks Mylar or Tedlar, respectively, and produced by a DuPont Company), bias distortion was reduced because these films display substantially isotropic properties. Improved polyester films such as PEN, (which is a polyethylene naphthalate polymer, i.e., a type of polyester polymer), may also be used in a film form and is also available as a yarn. Composite films of more than one polymer may also be used such as disclosed in U.S. Pat. No. 5,221,569. As previously mentioned, the yarns in prior art fabrics may be substantially immobilized by hot calendaring, resin impregnation, resin coating, as well as the laminating with the above-mentioned films. Reduced anisotropic characteristics are thus obtained. Nevertheless, in sailcloth, bias distortions cannot be entirely minimized by the above described steps as dynamic loading of a sail is still not easily quantifiable in the various sections of the sail.

To overcome or reduce the bias distortion, sailcloth manufacturers also resorted to multi-ply sailcloth materials. These efforts have been made towards improving the warp characteristics by producing the so-called "warp insertion" materials and also by inserting composites in the X direction (the machine or warp direction and opposite to the cross-machine or Y direction during manufacture) the so-called X-Ply materials or diaxial material (hereafter X-Ply). The X-Ply materials are an open mesh in a form of a scrim or a scrim supplemented by parallel yarns. These scrim materials which have a fiber orientation at 90 degrees or less, at various angles to the warp, are typically placed across the fiber carrying the major intended load, and are covered with a polyester film in the sailcloth material. These multiple ply materials often carry, as the X-Ply material, expensive fibers such as Technora™ of Teijin Company or Vectran™. These multiple, composite materials carry the major load in the warp direction and are not only expensive but also rely on "over" design in the warp direction to over compensate for the bias distortion. Despite these weight and cost penalties, the X-Ply materials provide only, at best, an inexact, gross approximation to a load path when these materials are incorporated in a sail, typically in a gore form such as for tri-radial sails.

To minimize the cost of material and improve thread alignment, computerized nesting programs for cutting gores are available, i.e., for optimizing panel cutting such as for tri-radial sails. Still considerable wastage is experienced when making sails. Additionally, once distorted beyond a yield point, the films used in the laminate tend to break down or retain an irreversible shape without any recovery. Moreover, crinkling of the film and fabric composites and/or exposing these to sun also causes these materials to shrink to a greater or lesser degree. Bias distortion in these "panel optimized sails" is still introduced by the forces or stress exerted by aerodynamic loading of the sails as transferred to the "off-the-thread-line", and at boundary load concentration points, i.e., point loads of the sail. These stress concentration points consist primarily of a clew, head and tack points of the sail. Further, stress concentration is found at reef points, i.e., reef clew and reef tack, hanks, slides, battens, etc. In other words, the attachment means for the sail to a mast, stay, boom, or brace are typical stress concentration locations. These attachment points are also known as boundary point stress locations.

The reason for having repeatable consistency, i.e, properties in the warp, fill and bias e.g. 45 degrees direction for producing sailcloth and sails is made obvious when a distortion of two to four percent in a camber of a sail will result in significant performance differences. While a sail maker can measure the cloth properties in the machine direction and cross direction, i.e., or warp and fill yarns and has some confidence in the bias measurements, by experience, the consistency of available sailcloth material leaves a lot to be desired and leaves a sail maker at the mercy of a sailcloth manufacturer.

For the above reasons, the production of fiber oriented sails or structural sails (with added fabrics or scrim materials supplementing the primary yarns defining the primary structural elements) has come to be regarded as the best present-day solution to the bias problem. These observations have been especially noticeable with respect to the high-end sails used for Grand Prix racing, e.g. America's Cup racing. However, the addition of the materials such as scrims and X-Ply materials to the fiber-oriented sailcloth has complicated already an essentially batch sailcloth and sail making process. Often, during sailcloth manufacture, each of the laminating, yarn insertion, and scrim insertion steps is a separate operation causing each to be a separate batch operation step with high labor content and with great increase in the cost of the sailcloth.

Still further, with the increased availability of the esoteric yarns, e.g., of filaments such as PBO or oriented carbon nanotubes, the cloth costs increase dramatically as represented by the actual yarns carrying the loads in a woven sailcloth. In the woven material, the yarns which do not carry the load are said to "run off" the material and are not continuous from panel to panel, i.e., are not joined along the curves of the load path. The "off-the-thread" material in essence only partially participates in the load bearing but contributes to bias distortion. Consequently, a great percentage of the yarns away from the 90-degree orientation in a cloth are carrying a disproportionately higher price versus their ultimate load-bearing capability. However, the recently widely adopted gluing of seams for Grand Prix racing sails, as opposed to sewing, has displayed better load transfer properties between panels or gores. However, "seam creep" still arguably exists with glued seams and offset-seam double ply sails are being proposed as a very high cost solution to this problem. (cf. U.S. Pat. No. 6,112,689).

When producing fiber-oriented sails, the sails are sought to be made with yarn orientation in the sail in a manner such that the properties in each section of the sail are predictable and properly balanced. For "balance" considerations, the starting point is based on the available stress maps or load-path maps which give the principal stress and/or principal load paths and stresses about perpendicular to the principal stresses known as secondary stresses or secondary load paths. "Balance" is achieved when the distortion in any direction is predictable and uniform from batch to batch of sail material from panel to panel in a given sail or for same panels in related sails.

The most sophisticated software systems currently used for sail design combine a finite element analysis to model stresses within the sail membrane, with numerical flow codes to predict pressure variations over the curved sail surfaces. The two subprograms must be closely integrated because any sail shape change will alter the pressure distribution, and vice versa. Mainsail and headsail also interact aerodynamically to add another dimension of complexity.

Using these tools, a skilled designer can, in principle, fine-tune the curves of a sail so that the entry angles will harmonize with flow at every point up and down the luff as well as define the horizontal and vertical camber at any location. Camber deflection analysis is also available as a design tool.

Using the computerized stress modeling, the engineering of the sail can be optimized in terms of yarn density and orientation. Areas of maximum load or potential overload can be identified and subsequently reinforced. By the same token, lightly stressed zones can be pared down in the quest to save weight for Grand Prix racing sails.

As discussed above, in a sail, in different parts thereof, stress is experienced in a multitude of different directions. In a woven sail material, the balance consideration of properties requires that the optimum or least anisotropic properties are consistent from one batch of sail material to the other. A good sailcloth is said to be "flat," i.e., has been weaved with consistent tension in the warp and fill, producing no "bumps" or "bubbles." Further, the material properties are said to be of the same value, i.e., magnitude, for example for modulus, stretch or elongation, bias distortion, etc. Any change or deviation from batch to batch of the sailcloth material (or yarn-oriented sail material) distorts the sail unpredictably and causes the sail to perform unpredictably. Accordingly, if each sail material batch has different properties, the sail design cannot be made consistent. As mentioned above, by experience, it has been found that the horizontal depth or curvature of a mainsail, i.e., horizontal camber by as little as two to four percent will cause a significant change in the performance of the sail. Likewise, the change in the vertical camber will have drastic consequences in performance. The loss of performance is magnified if the curvature or camber migrates to a location in the sail different from that for which it was intended, e.g., towards the leach of the sail. For these reasons, eliminating variability and having predictable properties in a batch of conventional or fiber oriented sail material have been desiderata of all sail makers.

In the production of yarn-oriented sails, the consistency in yarn properties, the consistency of the structure, and the final laminate is just as much of importance as with woven sailcloth materials. As the design of the yarn-oriented structure in a sail is still bound up with considerable intuitive art, the predictability, while significantly improved over woven-material sails, nevertheless allows for great improvements in the component parts of the structure. Although development of structural, i.e., yarn-oriented sails in effect freed the sail maker from the sailcloth manufacturer, it placed a greater burden on the sail maker to produce consistent materials. Some of the alleged improvements in structural sails such as "round" yarns versus flat yarns, twisted filaments versus untwisted filaments, mixed fibers, etc. etc. have been more or less of defensive posturing or advertisement type rather than based on proven results. Nevertheless, the reduced costs in a structural sails designed with substantially all of the fibers of the filament yarn type carrying the load has been a notable advance.

However, the experience on race courses has shown that initial yarn-oriented sails were insufficiently strong when only primary yarns followed the load paths for the principal or primary stress. If no other than primary yarns were present and if the substrate, i.e., skin membrane was week, i.e., a polyester film, the sail was distorted. In other words, distortions due to aerodynamic loading had to be prevented by introducing complex secondary structure, i.e., a strong membrane or secondary structural members to prevent distortion.

Distortions in yarn-oriented sails appeared mostly but not exclusively in the horizontal direction, i.e., across the sail. Adding more primary yarn structure, and a scrim or taffeta combination has been an answer, albeit, an imperfect answer. Addition of scrim requires a separate manufacturing step and today two principal structural sail manufacturers, Sobstad, Inc., selling sails under the trademark Genesis and North Sails, Inc. selling its structural sails under the trademark 3DL, insert a layer of reinforcement, e.g., a scrim as a separate step in the sail/sail material manufacturing process. The third structural sail manufacturer Ulmer-Kolius known as UK Sailmakers selling Tape-Drive™ sails uses a cross-cut panel sail of conventionally woven material or an X-Ply improved material to place a yarn or strip structure on it.

BRIEF DESCRIPTION OF PRIOR ART

The two principal processes for making the fiber oriented or structural sails are represented by U.S. Pat. Nos. 4,593, 639, 4,708,080, and 5,355,820, and derivatives thereof assigned to Sobstad Corporation (U-K Sailmakers have been licensees of Sobstad Corporation) and U.S. Pat. No. 5,097, 784 assigned to North Sails, Inc. Neither of the two processes lends itself readily to continuous manufacture of sails or sail components or post manufacture processing, design changes or recutting of sails. While the 3DL™ process is a more direct material-to-sail process, it requires for heavier use sails a scrim insertion and vacuum lamination steps, on a mold, as separate discontinuous steps for the final sail material production. In the production of sails under the Sobstad process, the fabricated sail material must still be subsequently laminated in a separate step as shown in U.S. Pat. No. 5,355,820 with a scrim insertion during lamination.

A major problem for the monolithic mold made sails such as the North Sails 3DL™ sails has been reshaping of the sail after manufacture. While some reshaping has been possible based on varying the luff S curve, the lack of panels has made it necessary to cut the sail and introduce cut panels. Such post fabrication of panels has made it difficult to form a proper seam(s) and gluing typically must be done film to film.

While each of the prior art structural sail fabrication methods has its benefits and short comings, each method addresses shape design into a sail differently. According to the method practiced by Sobstad, panels are shaped by broad seaming; and, for effective gluing, panels are often turned over to glue yarn-to-yarn. Lamination thus requires that layer schedule be the same on both sides of the panel. In the 3DL™ method disclosed in U.S. Pat. No. 5,097,784, the complexity of shape design resides in the mold contour control; the pre-shaping of the film and scrim in panels which then must be placed on the mold; the inability to vary economically the yarn content or mixture from place to place in the sail as needed; the awkward manipulation of yarns in the corners and at the edges of the sail; the complexity in the fiber orientation to produce an approximation of the primary and secondary load paths; the shape adjustments when cutting the sail etc., etc. These and other shortcomings of the prior art have been minimized by the present invention as will now be described.

BRIEF DESCRIPTION OF THE INVENTION

The present invention is an improvement in the method of manufacturing yarn-oriented sails with the objective to improve the process of producing. Further, the process addresses the problem of "seam creep" and seeks to make other improvements in the manufacturing steps and in the product properties. The shortcomings associated with the individual step-and-index panel stringing fabrication of the yarn-oriented sails is overcome by laying out fibers on a full sail or a number of large sized panels with individually laid out panels but with all the individual yarns related from panel to panel.

Accordingly, a sail with the pre-shaped panels, e.g. for scrim reinforced substrates, need not be made on a curved mold but can now be made on a flat surface. Such production method significantly reduces the capital investment and mold fabrication as well as mold adjustments needed for each sail. Moreover, sail panels produced according to the present invention are nested in an improved manner. These panels can be seamed in a pre-selective, i.e., pre-designed manner. Hence, sail shape design may be made by an improved combination of luff curve shaping and broad seaming and gluing of the panels.

Sails produced by the present method are fiber tension controlled and are capable of being made in an unlimited variety of primary and secondary oriented yarn-panel layouts allowing design freedom for further exploring and developing yarn layouts achieving optimum "balance" properties.

As primary and secondary structural members, i.e., yarn orientation in a sail and in each individual specific panel still allows great freedom of experimentation, the improved production method provides various layout variations for yarn-orientation and design. The resulting sails are accordingly a further improvement in yarn-oriented load path specific sails. Accordingly, the present sail making method allows each yarn path to be terminated by forming figure eight patterns outside the defined sail boundary and boundary-point locations such as of a clew, tack, or head.

A turret device disclosed herein allows such operation to be carried out. Such yarn layout and termination feature is especially advantageous when the yarns terminate at the head, tack, clew, or a reef tack and a reef clew.

The new method for producing sail materials allows the obtention of a sail which, by the method of production, minimizes the short-comings associated with prior art sails.

The present invention allows the formation of precursor panel components for a sail, lamentation of such precursor panels, and broad seaming panels derived from the precursor panels and gluing the thus obtained panels to form a sail which is finished in the conventional manner.

An especially advantageous aspect of the present invention resides in a machine or apparatus for producing a series of specific related sail panels for an entire sail suitable for proper broad seaming and incorporation in a sail. Still further, the present invention relates to a sail obtained by the method as practiced herein and by the use of the apparatus described herein.

Other benefits and advantages shall appear further upon the description of the various aspects of the presently disclosed embodiments relating to the method apparatus and/or products.

DETAILED DESCRIPTION OF THE INVENTION, DRAWINGS, AND EMBODIMENTS OF THE INVENTION

With reference to the drawings schematically illustrating various embodiments of the invention and without limiting other aspects of the invention:

FIG. 3 illustrates in a plan view precursor panels and seams for a jib sail made on a flat table;

FIG. 3A illustrates in a plan view an embodiment for reversing directions at a corner of a sail;

FIGS. 10A and 10B illustrate in a partial side and front view, respectively, an embodiment for laying down the continuous filament yarns on a precursor panel surface as an embodiment of the device shown in FIGS. 5 and 6;

Figure 5:
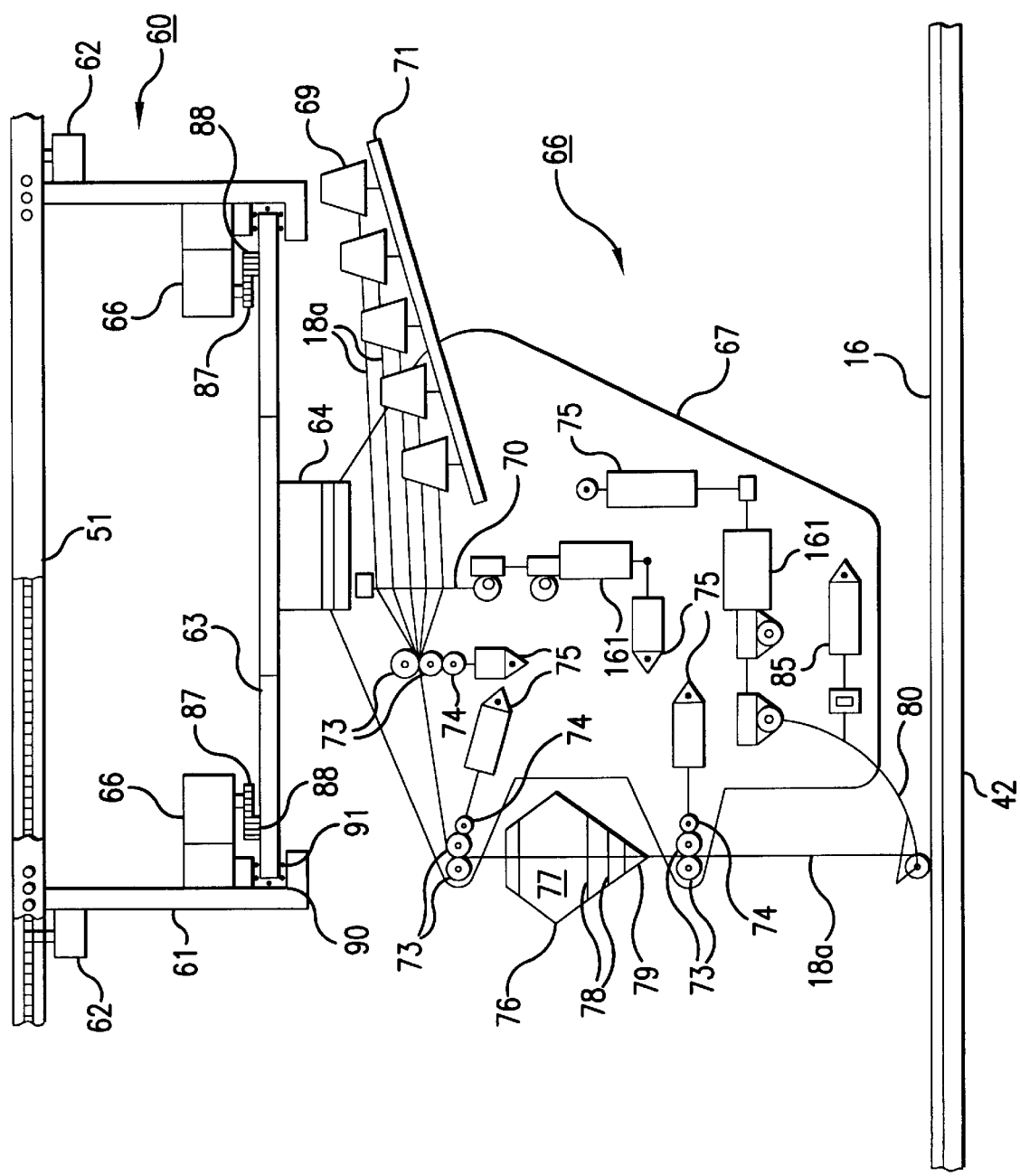
FIG. 5 illustrates schematically in a partial left-hand side view a gantry and a turret shown in FIG. 4 including a yarn dispensing device.
Figure 6:
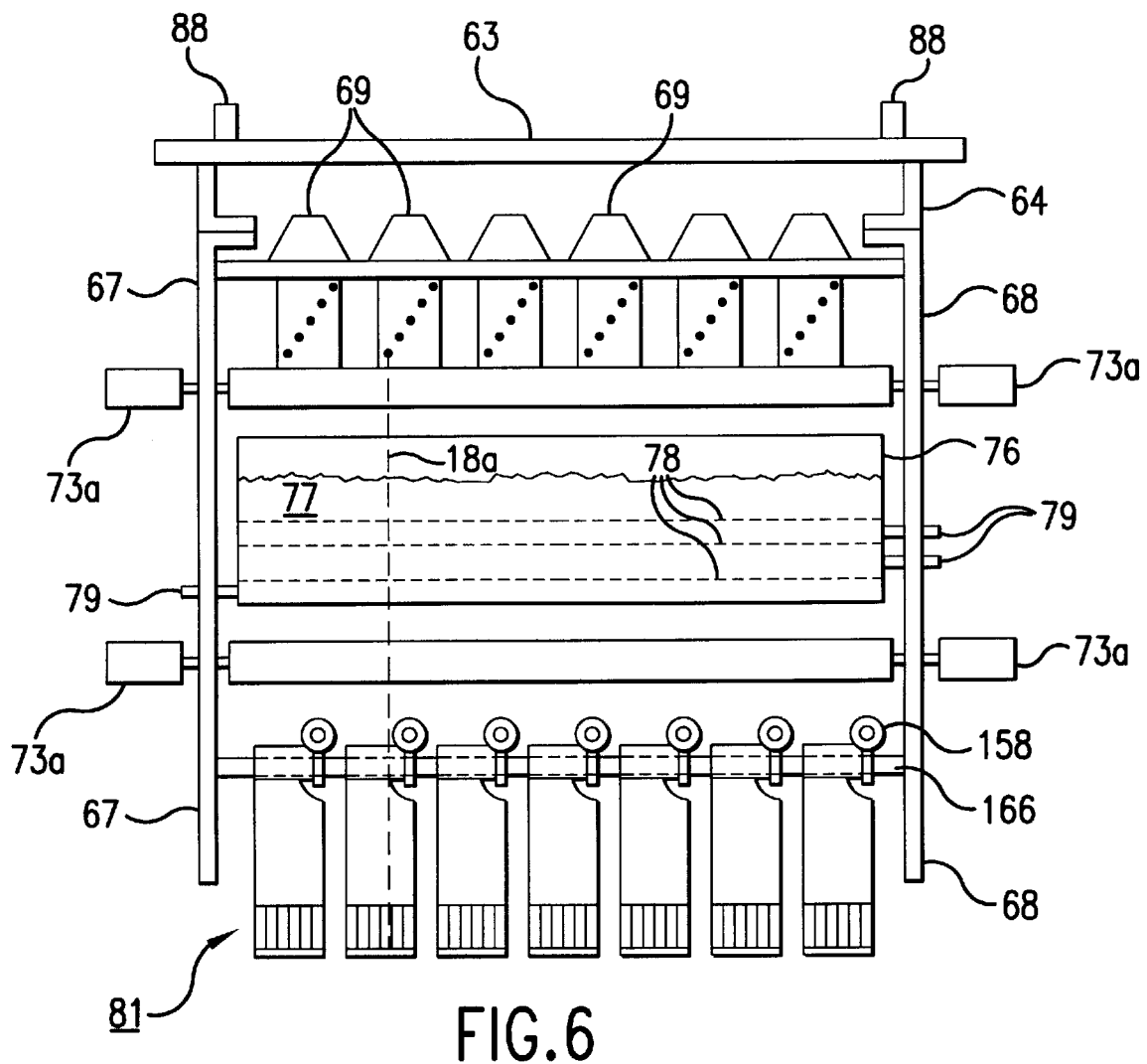
FIG. 6 illustrates in a partial front plan view the yarn dispensing device shown in FIG. 5 in a side view.
Figure 12:
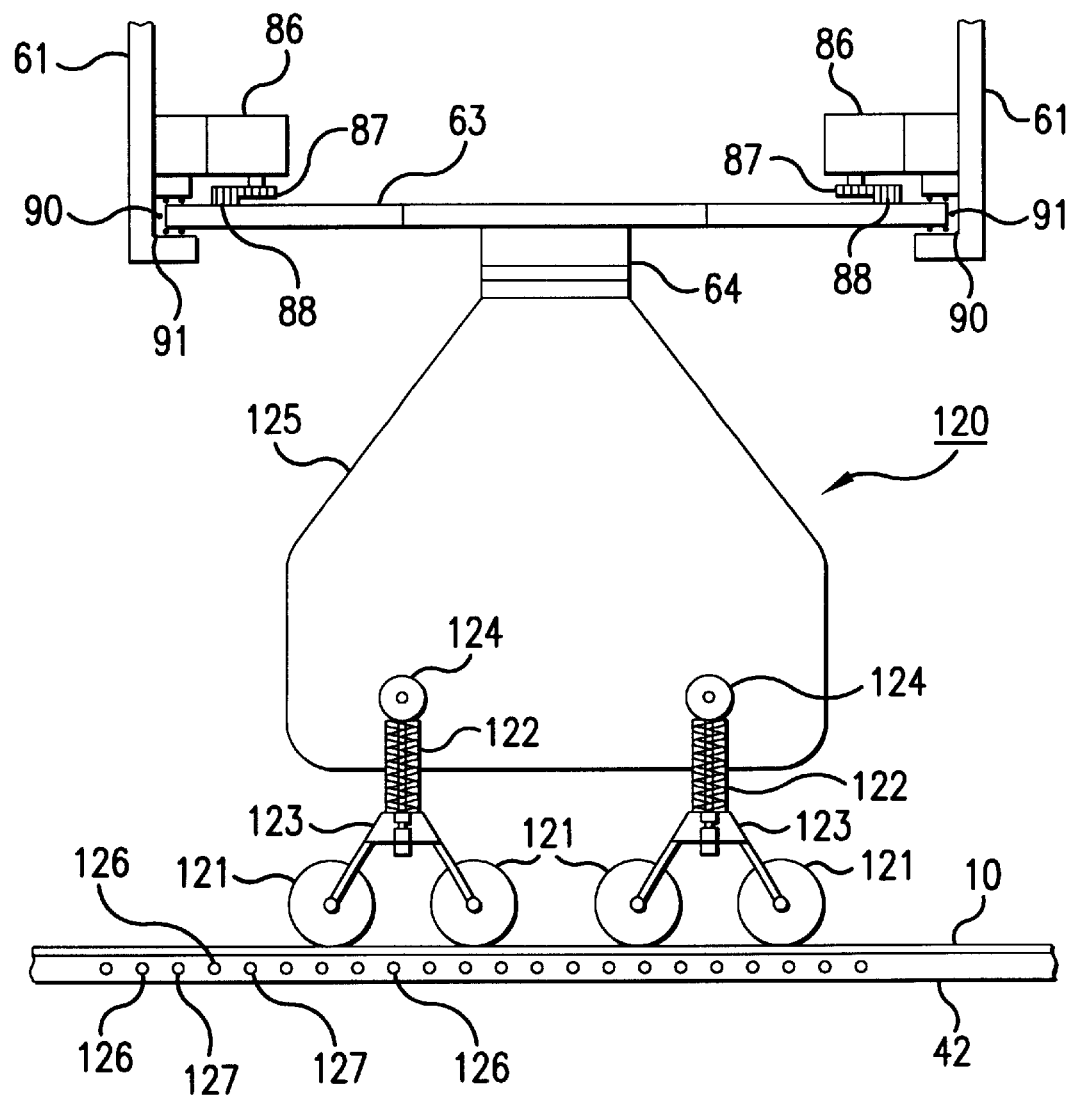

FIGS. 11A and 11B illustrate in a partial side and front view, respectively, another embodiment for laying down a continuous filament yarn on a surface, as an embodiment of the device shown in FIGS. 5 and 6; and FIG. 12 illustrates schematically in a partial side view a pressure roller attachable to the gantry in FIG. 5 (instead of the yarn dispensing device) for pressure laminating layers of materials to form a sail.

Figure 1:
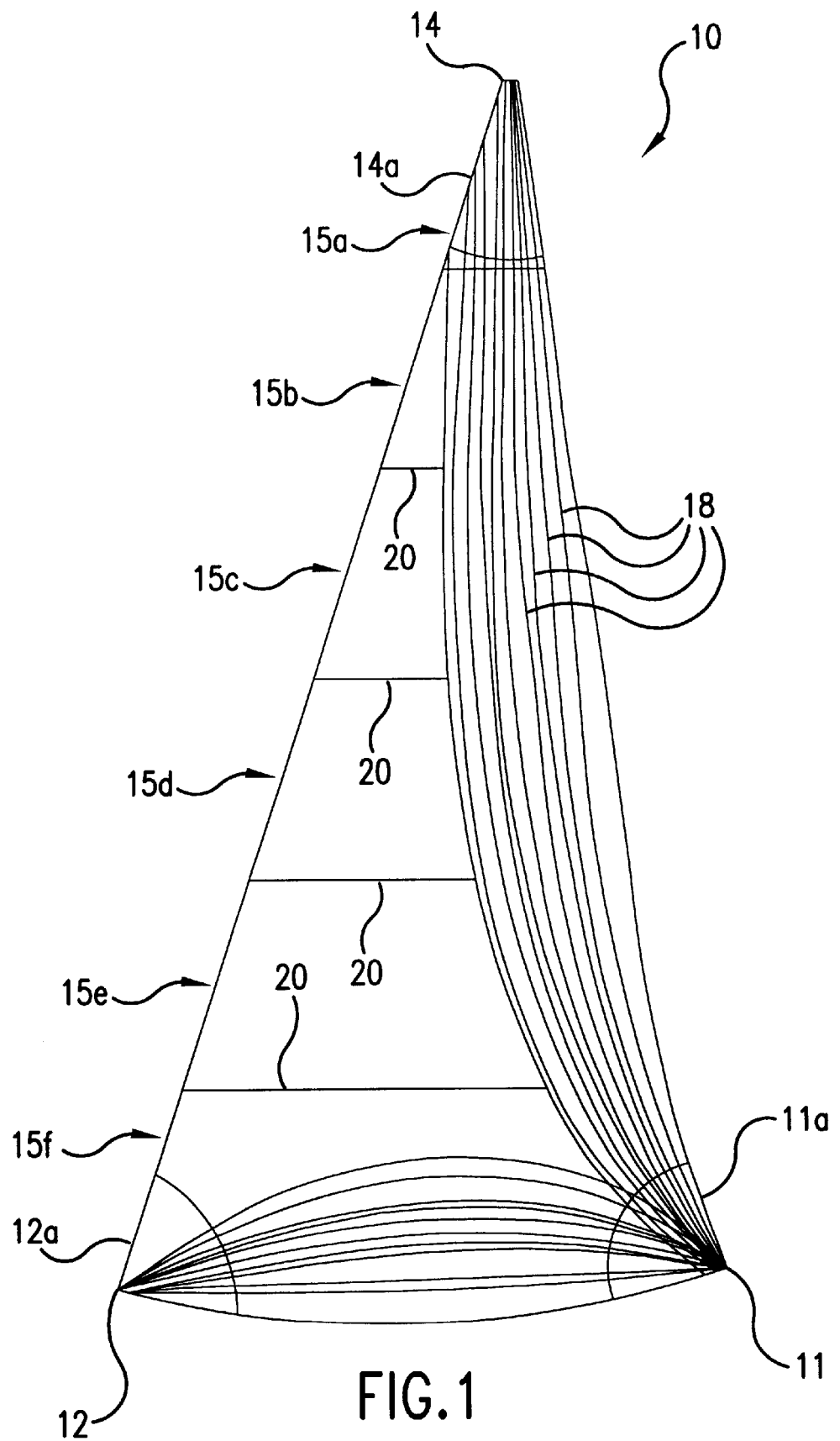
FIG. 1 illustrates in plan view a jib or genoa sail partially fabricated.

With reference to FIG. 1, it illustrates a jib or genoa sail 10 having a clew 11, tack 12, and a head 14. Typical corner patches of these sails have been shown for the clew, tack, head as 11a, 12a, and 14a respectively. Substrates 16 for panels 15a to 15f are either a Mylar™ polyester film from 0.5 mils to 2 mils typically 0.75 mils to 1 mil, a Mylar™ film reinforced with a X-ply carbon filaments, aramid scrim, or like material; or a Dacron™ taffeta. Seams 20 delineate the respective substrate panels which may be as few as two or three or as many as are necessary based on the available width and size of the material. Typically, sailmakers have used substrates based on available materials, for example, films may be from 40 inches to 120 inches wide. Reinforced Mylar™ materials are often expressed in terms of a "sailmakers yard" which is typically a material one yard long (in machine direction) and 23 inches wide (cross-machine direction). However, the materials may come in various width. Seams 20 impart both horizontal and vertical camber to the sail when cut for purposes of broad seaming the product, i.e., cutting and making a curved seam, as will be further explained herein.

In FIG. 1 the partially completed yarn lay out illustrates schematically the glued down continuous filaments yarns as these yarns are being laid in a curved path and form primary structural members 18. The curved path represents schematically a load path. For purposes of this application, these continuous filament yarns are called primary structural members 18 but the meaning of the yarns, i.e., the structural members depend on their location in the sail. When substantially traversing the sail from head 14 to clew 11, head 14 to tack 12, or clew 11 to tack 12, or vice versa, these yarns are considered primary structural members 18.

Figure 2:
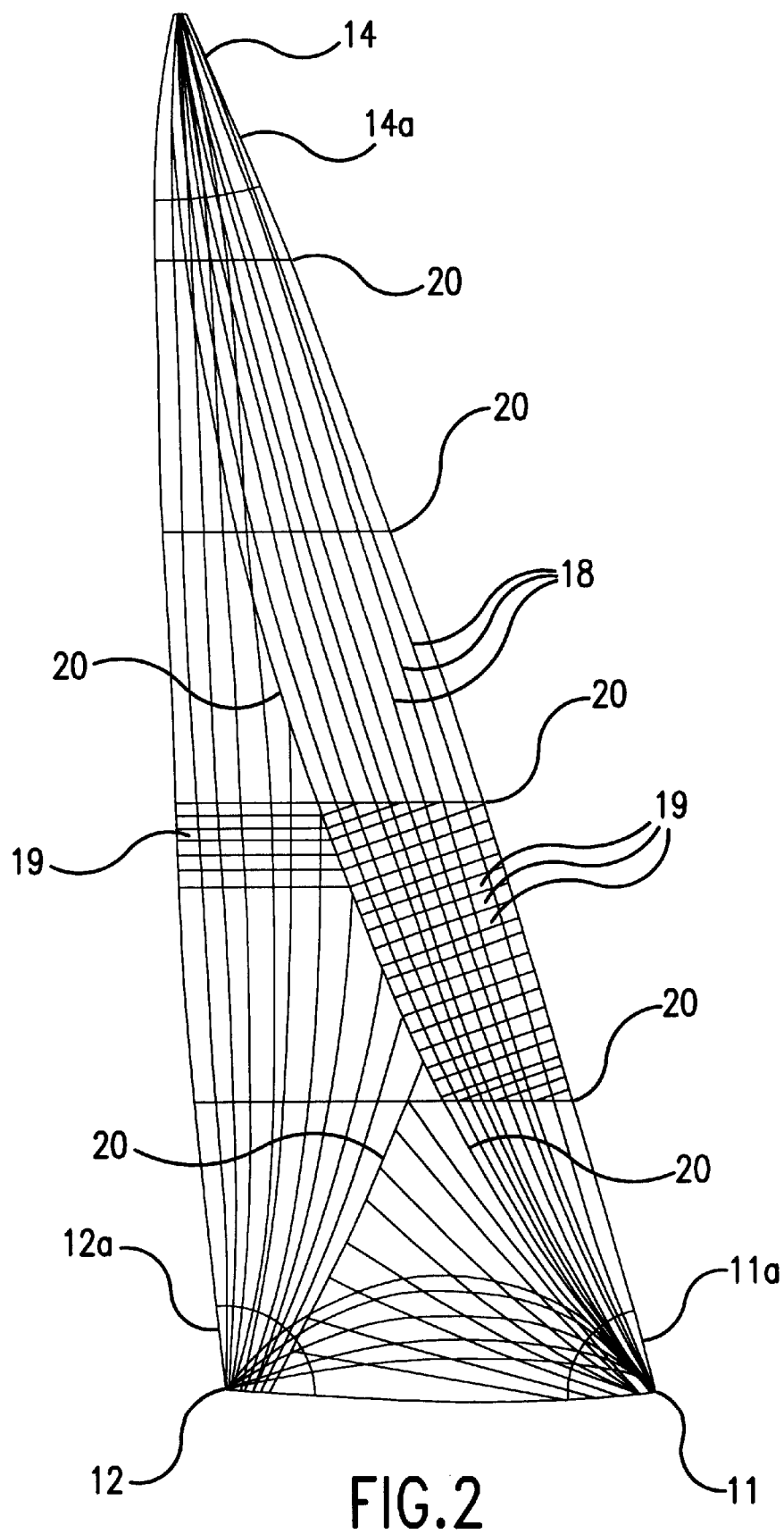
FIG. 2 illustrates in plan view a mainsail with various panel arrangements.

When the yarns traverse from clew to luff 13, (not shown but defined as about one third area from the front of the sail into the sail body) or leach 17 (not shown but defined as generally being the area one third of the sail from the aft edge of the sail into the sail body), these yarns may be a mixture of primary or secondary structural members depending on the yarns which these intersect and the function these yarns perform. For sake of simplicity, the yarns which cross the yarns traversing the entire sail from one corner to another and cross at about 70 to 90 degrees are considered secondary structural members and have been identified in FIG. 2 by lines 19. The yarns which when intersect other yarns at about equal to or less than 75 degrees may be considered primary structural members when these originate near a clew, tack, or head and intersect a yarn that reaches a clew, tack, or head. For illustration purposes, the secondary structural members 19 are shown in FIG. 2. In any event, the primary emphasis is to make a force or stress distributive network of yarns which if these do not follow the load path directly (for preferred optimum result) do form a structure which distributes the stresses in the structure in an improved manner from that found in typically cloth sewn sails be these of cross cut, miter cut, or tri-radial type cut sail. However, in a preferred embodiment a clew 11 and head 14, a clew 11 and a tack 12, and a tack 12 and head 14 are joined by continuous path of yarns that is structural members 18. In such an embodiment, the structural members 18 radiate out of a corner location and then converge and project back into another corner location.

The primary structural members 18 are typically of yarns of 400 to 4000 denier in size and are for medium size boats (boats 33 to 42 feet in length) typically of 400 to 1500 deniers in size. The size of the structural members depend also on the type of sail being used, that is for light, medium, or heavy weather sail.

The structural members 18 are laid down on a substrate 16 as shown in FIGS. 1, 2, and 3. The panels may be from clew to head or tack to head or even smaller sub-panels such as shown in FIG. 2. However, the preferable panel orientation for the substrate panels 16 is from luff to leach, which are known as cross-cut panels.

The secondary structural members constitute typically but not necessarily smaller sized yarns, that is from about 400 to 1000 deniers in size. For larger sails, that is for boats larger than 42 feet in length, the secondary structural members may be of the same size as the primary structural members 18. The secondary structural members may also be supplied in the form of scrim, X-Ply or filament reinforced Mylar™ films forming the precursor panel, i.e., the substrate 16. Accordingly, the secondary structural members 19 may be of a considerably smaller size in such a film and will be typically of a size purchased from suppliers furnishing such scrim reinforced film material. Such secondary structural member reinforcement may be on both sides of the primary structural members 18 sandwiching the primary structural members 18 therebetween.

If the reinforced material such as the Mylar™ film with various reinforcements such as Mylar™ and scrim are used, this material is typically cut in a form of the panel corresponding to the panel which forms the sail panel, e.g., 15d in FIG. 1.

As shown in FIG. 3, the lines along the luff that the yarns must follow are only slightly curved. In FIG. 1, the lines which the yarns must follow in the aft part of the sail are significantly curved. In the same FIG. 1, the lines between clew 11 and tack 12 are severely curved. The primary structural members following these lines must be sufficiently adjusted both to converge and diverge and the present device as shown in FIG. 5 for dispensing the yarns 18a, i.e., for structural members 18 accomplishing such purpose.

In FIG. 3 the panels 21a, 21b, and 21c are manufactured in a manner to allow interdigitation of various layers of material in the sails and, thus, improve broad seaming of the various panels. The structural members 18 are matched as closely as possible to the load path lines between each adjacent panel and define a smooth curve. In FIG. 3, the seam 20 width is defined by the two dash lines 20. The transitory offset section which is provided for the proper interdigitation of the panels is defined by the lines 23 and 24 respectively.

Transitory offset sections 23, 24 represents the necessary compensation which must be made to allow the panels, e.g., 21a and 21b to have a smooth load path transit lines across the seam 20 despite the cutting and broad seaming of the individual panels. The transitory offset is accomplished by the means as disclosed herein namely with reference to the yarn dispensing device in FIG. 6 herein. Although the sail may be constructed without the transitory offset sections 23, 24 as shown in FIG. 1, the sail must then be trimmed along the entire length of leach and luff when the individual panels are cut and broad seamed, thus affecting the yarns along the load path at luff and the leach and not assuring as smooth a transfer of the load path across the seams 20.

Figure 3B:
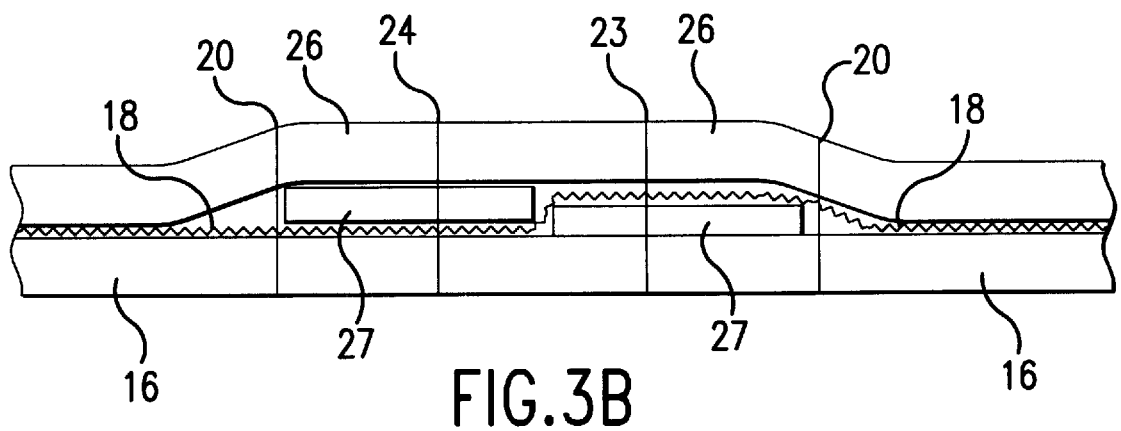
FIG. 3B illustrates schematically in a cross-sectional view a seam before it is glued together.

In FIG. 3B, the entire transitory offset section 23 and 24 is illustrated in cross section but not to scale. The seam width, before gluing is defined by the lines 20 and the upper film or reinforcement material by 26. A pair of strips of two-sided release medium 27a and b and the lower film or lower reinforcement medium which is the same as substrate 16 in FIG. 1 is identified accordingly as 16. When broad seaming, for example panels 21a and 22b, depending on the desired seam width, the broad seam is defined within the transitory offset section 23, 24 and seams 20.

When assembling a seam from the panels manufactured according to the invention herein, each strip of the two-sided release medium 27a and b are removed by peeling back the upper and lower films 26 and 16 respectively. It should be noted that in FIGS. 3B and 3C the right-hand release medium 27a as shown in these figures is under the yarns or primary and secondary structural members 18 and 19 and the left-hand release medium 27b is above the yarns, i.e., the primary and secondary structural members 18 and 19. It should further be noted that the secondary structural members may be part of the upper or lower films 26 and 16 respectively. In such embodiment, only the primary structural members 18 constitute the laid yarn portion of the sail.

Figure 3C:
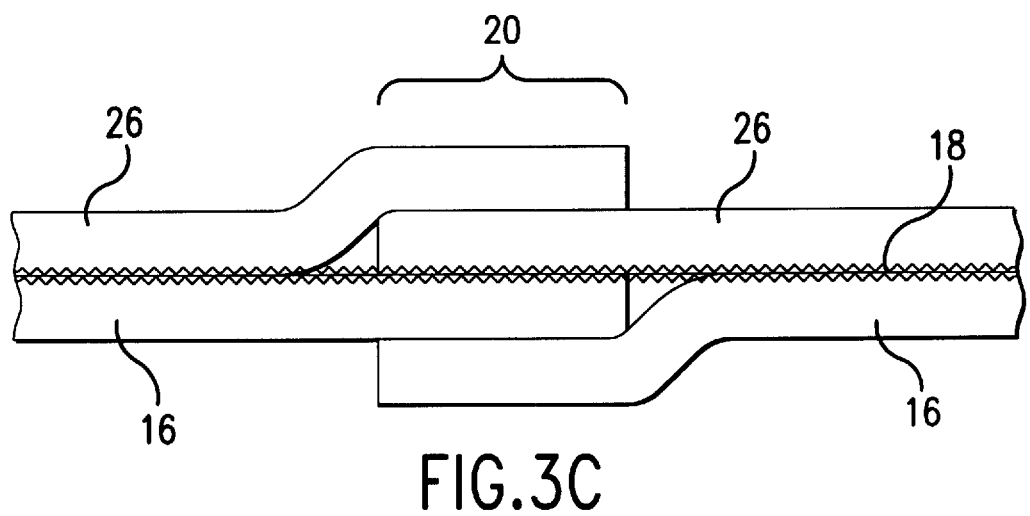
FIG. 3C illustrates schematically in a cross-sectional view a finished, glued seam.

Inserting a thin film of a heat activatable adhesive such as blocked cyano acrylates, or blocked polyexpoxy precursors or a glue between the upper film 26 and the yarns making up primary structural members 18 (and if present also secondary members 19) and sliding the adjoining panels into each other with a yarn-to-yarn surfaces overlapping each other in the interior of the seam and adhesively securing these two layers, i.e., 26 and 16 to each other will provide for the best possible bond. While the gluing may be carried on step wise, that is, by securing the interior bond first, the entire operation may also be carried out in one step by gluing the interior and exterior bonds in one step. Again, the film to film surfaces formed by the upper film 26 and the bottom film substrate 16 between each adjoining panel add considerably to the seam strength. The carefully aligned yarn-to-yarn gluing in the interior adds considerable strength to the seam. The finished seam is as illustrated in FIG. 3C. In order to assure better bonding between the layers, the surfaces of each are recommended to be kept clean or cleaned with an appropriate solvent. Applying heat, ultrasound, or irradiation, e.g., by microwaves and pressure to the completed and immobilized seam assures the outstanding advantages to the seam assembly.

Returning to FIG. 3A, it illustrates an embodiment how the continuous filament yarns are laid down in each corner by forming a multiple of circles on top of each other by means of the yarn dispensing device 66 shown in FIG. 5. The film, not shown, or a disposable Velcro™ hook side may be used to imbed the yarns introduced onto it. After finishing the sail 10, the Velcro™ layer may be removed from the sail.

Figure 4:
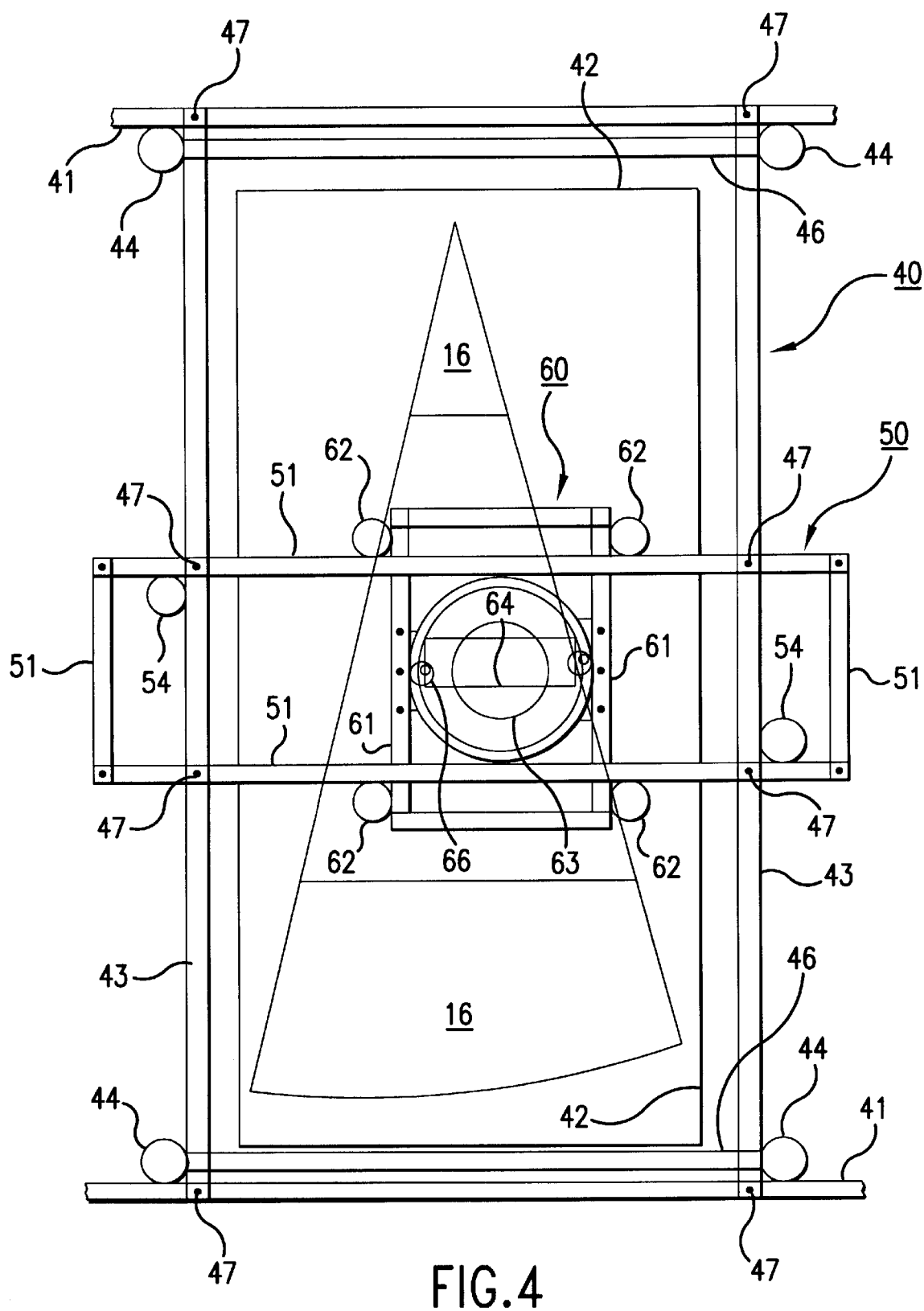
FIG. 4 illustrates schematically in a top plan view a table with associated gantry and turret devices for laying down continuous filament yarns on a sail precursor shape.

With reference to FIG. 4 gantry device 40 consists of rack rails 41 at each end of lay up table 42. At each corner of gantry frame 43 is a D.C. reverse polarity pinion motor 44 which has a pinion gear 45 (not shown) engaging rack 46 (not shown) in rack rail 41. To simplify the drawings, the details of the rack 46 and pinion gear 45 have been omitted but are represented schematically, for example, by the pinion motors 44.

Gantry frame 43 has a cross frame member 46 providing sufficient rigidity. Gantry frame 43 rides on captured roller bearings 47 on rack rails 41. Accordingly, the gantry frame 43 moves in a plane from left to right and vice versa.

Top gantry 50 consists of top gantry frame 51 riding on gantry frame 43, driven by top gantry pinion motors 54 engaging a rack (not shown) on gantry frame 3. Top gantry pinion motors 54 (D.C. motors with reverse polarity) move the top gantry 50 as shown in FIG. 4 in a horizontal plane back and forth (in the FIG. 4 drawing up or down). Turret gantry 60 consists of a turret gantry frame 61 on which are mounted four turret gantry pinion motors 62. Again, these are D.C. motors with reverse polarity allowing the motor to drive the pinion (not shown) in both directions. The turret gantry frame pinion motors 62 engage a rack (not shown) on top gantry frame 51 on the outside thereof driving the turret gantry frame 61 in a plane back and forth (in FIG. 4, e.g., left or right).

The advantage in providing for a lesser weight gantry such as 60 is that it requires less force to overcome the inertia when moving the turret gantry frame 61 and having it do the primary traveling in the planar directions of X, e.g., left to right when laying down the continuous filament yarns for the primary and secondary structural members 18 and 19 respectively. As shown in FIG. 3, top gantry 50 moves in the Y direction, i.e., up and down.

Further details for the turret plate 63 and the turret 64 shown in FIG. 4 will be illustrated in FIG. 5.

Turning now to FIG. 5 it illustrates schematically a left-hand side view the turret plate 63 with a turret 64 mounted thereon. A turret 64 may be quick bolted unto turret plate 63 for facile change of the continuous filament yarn dispensing head 66 such as when changing the weight of primary or secondary structural members 18 and 19, respectively. Yarn dispensing head 66 has a left plate 67 shown in FIG. 5 and a corresponding right plate 68 (not shown in FIG. 4 but shown in FIG. 6) arranged perpendicular to the left plate 67 and between left plate 67 and right plate 68 are the various constituent parts for the dispensing of the continuous filament yarns which make up the primary or secondary structural members 18 and 19 respectively.

Bobbins 69 hold the continuous filament yarns 18a which when laid down are the primary and secondary structural members 18 and 19. For example, yarns 18a proceed through the adjustable yarn reed device 70 shown in FIG. 9 the adjustability being obtained as further illustrated in FIGS. 7, 8, and 9. Various facets of the adjustability features will be further discussed herein.

The bobbins 69 are arrayed on a bobbin plate 71 which holds, e.g., a 5×7 array of thirty-five bobbins as shown in FIG. 6 laying down in one path thirty-five structural members 18. This number is sufficiently adequate for a larger size yarns which may be laid down in a single path radiating out from a corner into a sail and converging into another corner whereupon the primary structural members 18 shown in FIG. 3A may be reversed in one sweep in a clockwise direction at one turn and counterclockwise at another like turn, e.g., at clew 11.

After proceeding through the lateral yarn adjustment reed device 70, the yarns go through a set of driven double rollers 73. The nip pressure may be further adjusted such as by a pneumatically urged pressure roller 74. The pneumatic cylinders for pressure rollers 74 are shown as 75. From a driven double rollers 73, the yarn enters the glue bath 76 holding a glue 77 such as a hot melt glue or any other suitable glue of high strength and high peel resistance. Flexible doctors blades 78 on each side of yarns 18a, such as made from an elastomer, doctor the glue being deposited on the yarns 18a. A source of pneumatic air 79 throttles the amount of glue being allowed to leave the glue bath 76 from the last chamber formed by the last set of doctor blades 78 and glue bath container 76.

The last set of driven nip rollers 73 aid in laying down the yarn 18a on the substrate 16 via the laterally adjustable and flexible yarn dispensing arms 80. The substrate 16 is secured to the table by suitable clamps and aided by vacuum exerted on the substrate.

The laterally adjustable yarn reed device 70 and the laterally adjustable yarn dispensing device 81 work in tandem and are synchronously adjustable by the lateral adjustment devices shown in FIGS. 7, 7A, 8 and 9. Inasmuch as the lateral adjustment is the same for the devices 70 and 81, the adjustment will be discussed with reference to FIGS. 7, 7A, 8 and 9.

Yarn dispensing arm 80 has a dispensing wheel 82 and a guide shroud 83 therefor. Two embodiments of the yarn dispensing arm 80 are shown in FIGS. 10a and 10b as one and FIGS. 11A and 11B as another. In the FIG. 11A embodiment instead of a wheel, a yarn guide flute 84 with extension arm therefore 84a is illustrated. By appropriate retraction, that is force exerted on the yarn dispensing arm 80, by the pneumatic cylinder 85, the pressure with which the yarns 18a are laid down as structural members 18 can be controlled. In turn, by the pressure exerted by the double rollers 73 the yarn tension 18a may be controlled.

The load path curves in the sail 10 and thus the placement of primary structural members 18 such as shown in FIG. 1 are being developed by the slight rotation of the turret plate 63 as it is being driven by the turret plate D.C. motors 86 driving pinions 87 on the circular gear/rack 88. Turret plate 63 rides in a U-shaped channel 90 on turret plate ball bearings 91. As shown in FIG. 4, turret gantry frame 61 is driven by four or less turret gantry frame pinion motors 62. The rack therefore (not shown) may be mounted on the top gantry frame 51 and driven by D.C. motors 62 in a plane back and forth and if necessary aided by the top gantry pinion motors 54.

A turret gantry frame 61 may be in a form of a C or box section beam with a slit into which appropriate ball bearings may ride. The various motions which may be obtainable from the gantries 40, 50, and 60 and the turret 64 allow a precise control of the load path curves or transitory areas in a seam (such as defined by lines 23 and 24) giving a smooth continuous, curve appearance to the structural numbers 18 in the assembled sail without the abrupt angler change seen in some of the structural sails of the prior art. Such smooth transition minimizes seam creep.

Figure 7:
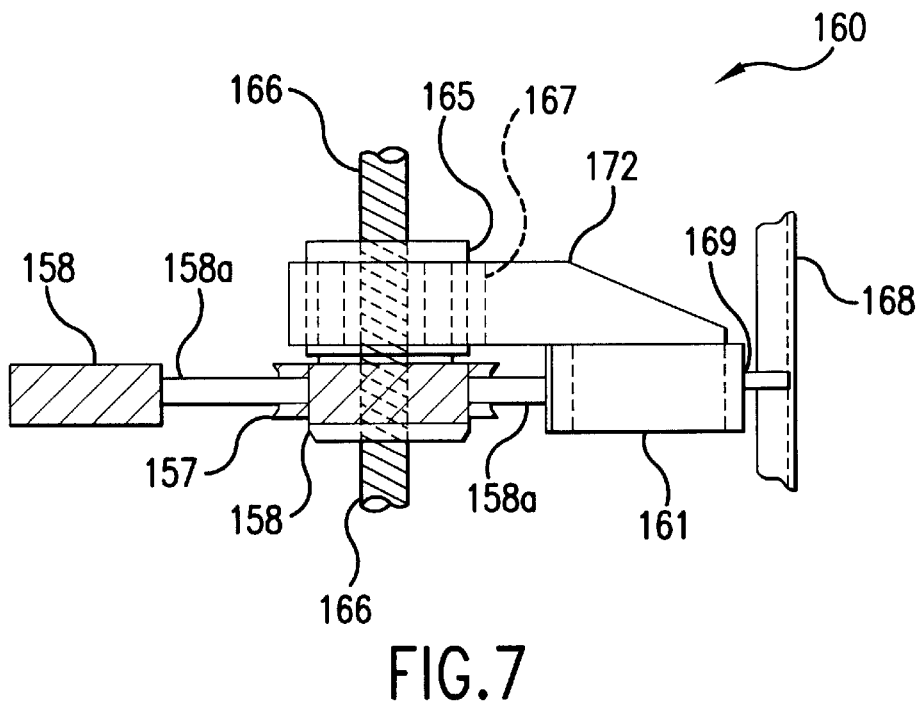
FIG. 7 illustrates in a top plan view an adjustment means for dispensing yarns in a straight, or an adjustable radiating or converging manner for the yarn dispensing device shown in FIGS. 5 and 6.
Figure 9:
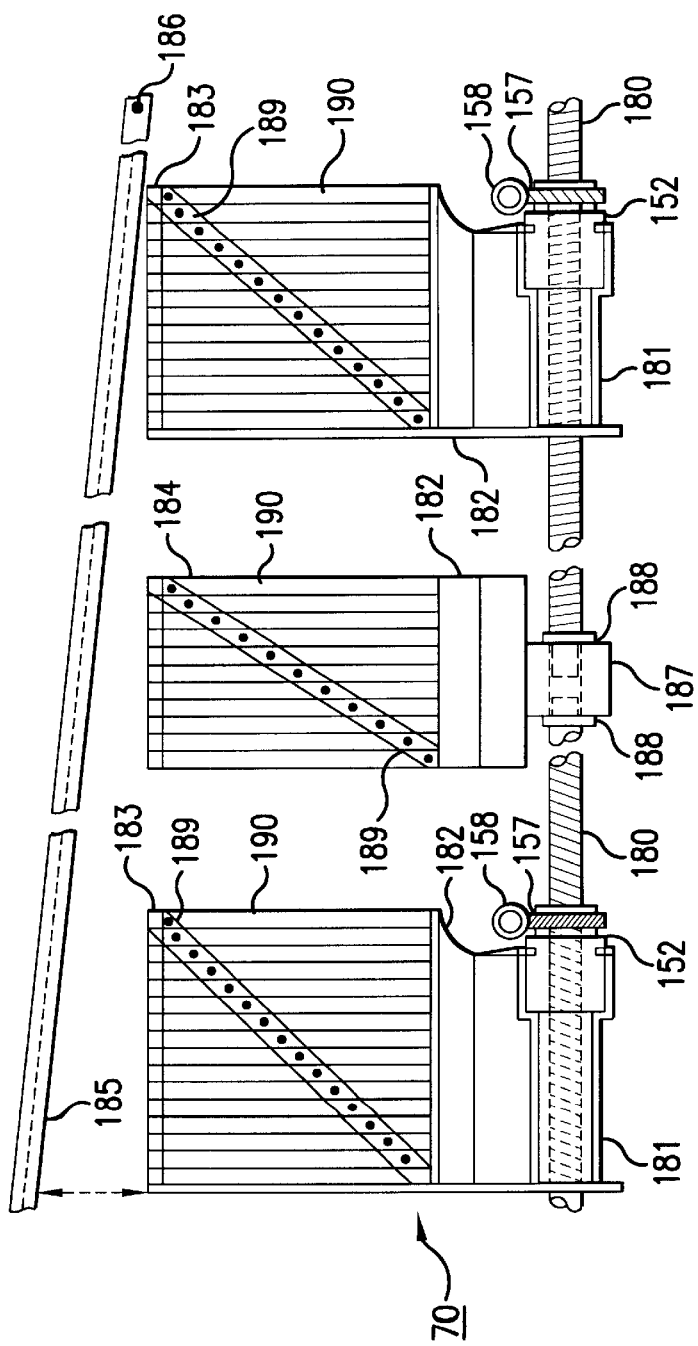
FIG. 9 illustrates, in front plan view the laterally adjustable yarn reed device shown in FIGS. 5 and 6.

Turning now to FIG. 7, it illustrates the synchronous adjustment means 160 for the mechanism which makes the fine-adjustments to the laterally adjustable yarn reed device 70 and laterally adjustable yarn dispensing device 81. The adjustment is made via the worm pinion gears 158 and worm wheels 157 by the pinion motor 161 and thus the threaded transmission sleeves 165. The worm pinion motor 162 drives worm pinion shaft 158a as well as the worm wheels 157. A reversible polarity D.C. motor 161 drives the transmission sleeve 165 laterally back and forth on threaded n rods 166. The threaded transmission sleeves 165 are with either a left or a right hand thread or may be split in two groups one with left and another right hand threads. The thread direction depends on the selection of the embodiments but preferably involves only threads with a single direction. Nevertheless, the embodiment in FIG. 9 illustrates a stationary center section 184 and left and right-hand sections 183 as further discussed in conjunction with FIG. 9.

The number of threaded transmission sleeves 165 are the same for each threaded rod 166 for the yarn reed device 70 and yarn dispensing device 81.

Figure 8:
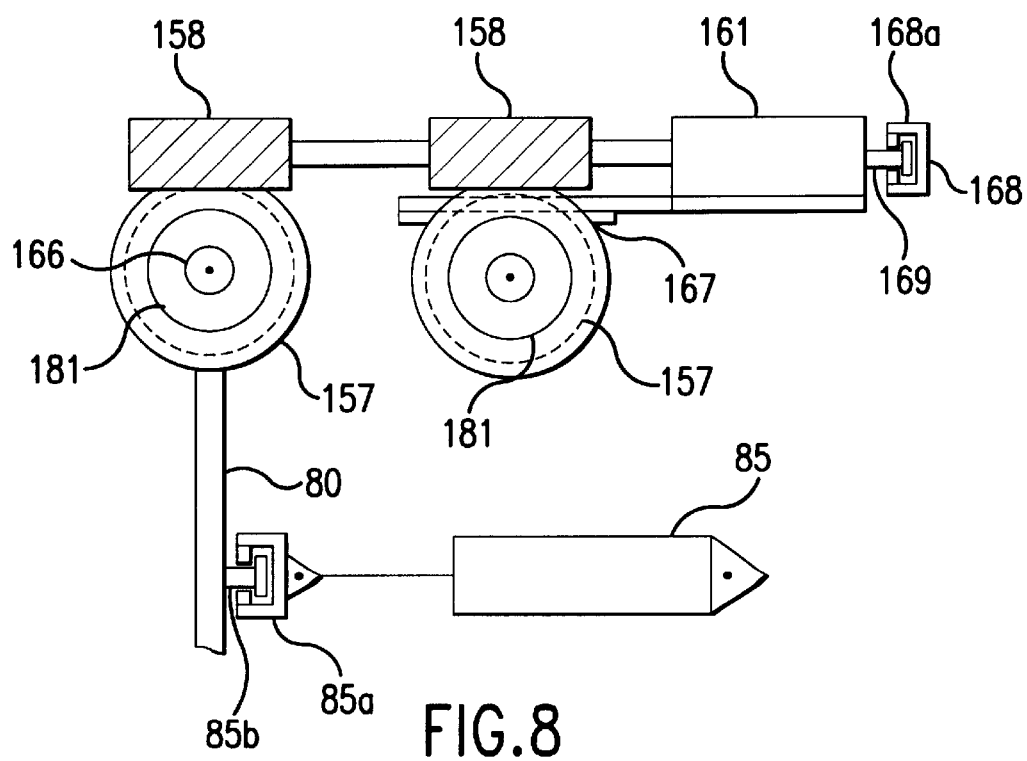
FIG. 8 illustrates in a schematic partial cross sectional view an engagement position for the adjustment means of FIG. 7 and 7A useful for laterally adjusting the yarns dispensed from the device shown in front view in FIG. 6.
Figure 7A:
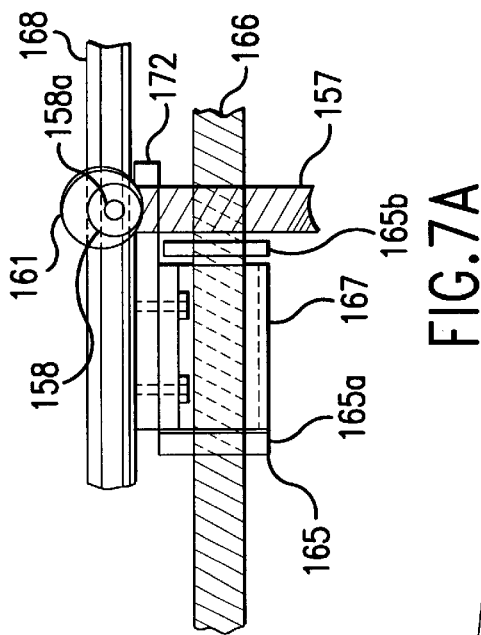
FIG. 7A illustrates in a left-front plan view the device of FIG. 7.

A synchronous adjustment is made to all of the corresponding threaded transmission sleeve 165 segments for the yarn reed device 70 and yarn dispensing device 81 via the threaded rods 166. The rotating threaded transmission sleeves 165 are permanently joined and are held to the worm pinion motor 161 by the transmission bushing clamp 167 as shown in FIG. 7A such that the threaded transmission sleeve 165 can freely rotate between the lands 167a and 167b on the threaded rod 166. As shown in FIG. 7, a U-shaped channel 168 has a pin 169 (protruding from worm pinion motor 161) riding laterally in the U-shaped channel 168. As will be further discussed herein, the U-shaped channel 168 has at least two or more pneumatic cylinders 75 (not shown in FIG. 7 but shown in FIG. 6) connected thereto. Upon a retraction stroke, pneumatic cylinders 75 engages the worm wheel 157 on the threaded transmission sleeve 167 holding positively the worm wheel 157. A double worm wheel arrangement allows the facile removal of either the yarn reeds 183 shown in FIG. 9 for the yarn dispensing device 81. However, as another embodiment, the yarn reed device 70 and the yarn dispensing device 81 is capable of being run with only one threaded rod 166 for each and consequently, one threaded transmission sleeve 165 for each of the segments in the devices 70 and 81. With reference to FIGS. 7, 7A, and 8, these illustrate schematically the worm pinion motor 161 and the U-shaped channel 168. These views in FIGS. 7, 7A, and 8 also present the transmission sleeve 165 and the threaded rods 166. FIGS. 7, 7A, and 8 thus complete the illustrations in FIGS. 5 and 6 concerning the manner in which the fine adjustment is made to each of the yarn reed device 70 and yarn dispensing device 81. Accordingly, the structural members 18 may be laid out convergently and divergently in smooth uniformly spaced apart curves following the load paths.

In FIG. 7A, the worm pinion motor 161 is shown as mounted on an offset platform 172 which in turn is attached to the threaded transmission sleeve 165. As a result, two worm pinion gears 158 are in line and can be driven at the same ratio and the same rate along the threaded rod 166. Although there is more torque on pin 169 shown in FIG. 7, pin 169 may carry at the end thereof a roller bearing (not shown) which is within the U-shaped channel 168. Accordingly, the worm pinion gears 158 drive the two worm wheels 157 respectively in a synchronous manner in an engaged position in a very positive and reliable manner.

With reference to FIG. 9, it illustrates in a partial front view the yarn reed device 70 which allows lateral adjustment of yarns being let into driven rollers 73. In its operation, the device 70 laterally extends or contracts and thus adjusts the dispersal or gathering of yarns 18a. In FIG. 9, locking device 185 is a U-shaped channel and holds the yarn reed device 70 segments 183 and 184. The U-shaped channel 185 in which the yarn reed segments 183 slide may be readily pivoted at pivot point. 186 thus rigidly securing the segments 183 to the frame from the yarn dispensing device 66 left hand and right hand plates 67 and 68 respectively shown in FIG. 5. In FIG. 9, the left-hand and right-hand threaded rod 180 functions in the same manner as threaded rod 166 in FIGS. 7 and 7A. In this embodiment, threaded sleeves 152 are moved with worm wheel 157 by means of worm pinion gear 158. A support sleeve 181 for yarn reed segments 183, 184, and base 182 thereof hold yarn reed segments 183 and 184 in a fixed position. The mid point yarn reed segment 184 does not move laterally in this embodiment and is in a journal box 188 for threaded rods 180 shown in this embodiment and is mounted on a fixed point 187. The additional reed guide 189 allows the yarns 18a to be confined in a smaller area rather than allow these to float within the reeds 190.

With reference to FIG. 12, it illustrates in a left-hand side view a combined pressure/heat lamination device 120 mountable on turret 64 shown in FIGS. 4 and 5. The left-hand plate 125 for the lamination device may also form a hood 130 (not shown) together with an identical right-hand plate (not shown).

When the sail 10 on table 42 is ready for lamination, a hot fluid in fluid conduits 126 is introduced to bring the sail up to temperature desired for lamination, e.g., about 180 to 220 degrees F. Vacuum conduits 127 are in communication with the table top of table 42 only in areas covered by sail 10. Uncovered areas of table 42 are blocked off. The hood 130 may also have radiating heat lamps (not shown) or hot air nozzles (not shown) for heating the pressure rollers 121 and sail 10 as the lamination takes place.

Pressure rollers 21 are typically covered with a heat resistant durable elastomer of a sufficient hardness. Inasmuch as the pressure rollers 121 are yoked in yoke 123 and can slightly but restrictively pivot on point 124, as well as have a slight restricted pivot motion in yoke 123, the yoked pair of pressure rollers 121 act as a nip on a double roller. Pressure may be regulated by the tension on springs 122 as well as by raising and/or lowering the table 42. As in the preferred embodiment such as shown in FIG. 3B herein, the upper film 26 and the lower substrate 16 may be pre-coated with heat activatable adhesive. The pressure lamination step may thus be carried out in a facile manner. Moreover, after seam 20 assembly shown in FIG. 3C, the laminating device on 20 may also be used for seam 20 lamination, with narrower pressure rollers 121.

By employment of the laminated sail fabric panels, e.g. 15c, the sail maker has an array of panel construction options available without the necessity to turn to a cloth manufacturer. The number of yarns that now carry the load may be as much as 40% greater from the yarns in prior art conventionally woven materials. The wastage associated with the sail material of the present invention is far less than the wastage associated such as with as tri-radial sail construction made from cut cloth gores which wastage is of the order 15–20 percent for tri-radial sails for the conventionally woven material employed. It should be remembered that considerable number of yarns "run-of-the thread line" in the prior art gore and panel construction. The present sail fabric panel engages nearly all of yarns to carry substantially all the load in a more balanced, predictable manner. Thus, the invention stands out for its simplicity, ease of sail construction, and benefits conferred to the sail maker and sailing public.

The balance in the sail material is achieved by the proper employment of the herein disclosed stretch resistant continuous filament yarns 18a for primary structured members 18 and secondary structural members 19 and any supplemental insert materials such as X-Ply materials.

Likewise, the film materials suitable for lamination, which have been disclosed herein, allow the design of sails of a panel construction of individually manufactured panels of outstanding properties.

What is claimed is:

1. A method for manufacturing a sail of a plurality of panels, said sail having at least three corners, said method comprised of the steps of:
   a. securing on a flat surface a series of substrate panels corresponding to at least a portion of a sail, wherein a substrate seam between each substrate panel extends from a first edge to a second edge of said substrate panel;
   b. placing a first strip of a two-sided glue release medium on one side of an anticipated seam, said first strip being placed on one side of said anticipated seam on a substrate panel;
   c. laying down with a glue or an adhesive material a plurality of continuous filament yarns on said substrate panels to follow primary and/or secondary load path for said sail when said sail is in use for its intended purpose;
   d. overlaying for each panel a second strip of a two-sided release medium near one edge of said first strip of said two-sided release medium and at top of said continuous filament yarns, wherein said second strip is next to said anticipated seam for a precursor panel contiguous to a precursor panel with a first strip thereon;
   e. securing adhesively a layer of a second film or a second sheet of reinforcement material on top of said plurality of continuous filament yarns thereby obtaining a plurality of precursor panels for said sail;
   f. cutting each of said precursor panels with a broad seam for said precursor panels for said sail along a seam between said first and second strip of said two-sided release medium;
   g. removing said first and second strip of said two-sided release medium;
   h. gluing and broad seaming overlappingly each of said precursor panels to its next contiguous precursor panel to form a sail of a plurality of panels wherein each panel joins the other with an interior seam having yarn to yarn relationship.

2. The method as defined in claim 1 wherein the substrate panel in a. is a polyester polymer film, a polyester polymer film reinforced with a scrim, a polyester polymer material reinforced with an X-Ply material or a woven polyester taffeta.

3. The process as defined in claim 2 wherein the substrate panel is a polyester polymer film reinforced with an aramid polymer scrim.

4. The process as defined in claim 1 wherein between each panel said continuous filament yarns are laid down in a transitory zone whereby interdigitation for each panel is provided for assembly for the making of a finished sail.

5. The process as defined in claim 1 wherein the continuous filament yarns are of an aramid polymer, carbon filaments, carbon nanotube fibers or ribbons, polyphenylene benzo bis oxazole polymer, a polyester polymer, or a polyalkylene polymer yarns.

6. The process as defined in claim 1 wherein the continuous filament yarns are laid down with a hot melt adhesive.

7. The process as defined in claim 1 wherein said second sheet is a polyester film, a polyester film reinforced with a scrim, a polyester material reinforced with an X-Ply material, a polyester film reinforced with a carbon filaments a polyester film reinforced with a taffeta, or a taffeta.

8. The process as defined in claim 1b wherein said glue or an adhesive material is a heat activatable adhesive.

9. The process as defined in claim 1 wherein the gluing in h is with an interleaved layer of an inactive glue and said glue is activated by heat, ultrasound waves, or irradiation.

10. The process as defined in claim 1 wherein the continuous filament yarns are laid down with increased density along a leach of said sail and towards the edge of said sail.

11. The process as defined in claim 1 wherein said second film or a second sheet of reinforced material has a pre-coated adhesive material thereon and said film is adhesively attached to said plurality of continuous filament yarns.

12. The process as defined in claim 1 wherein the substrate panels have a pre-coated adhesive on a surface on which said plurality of continuous multi-filament yarns are laid.

13. A sail as manufactured according to claim 1.

14. An apparatus for the manufacture of yarn-defined structural sails, said apparatus comprising:
   a table including means for a plurality of communicable vacuum passages on a top surface of said table;
   a plurality of continuous conduits in said table for passage of a heating medium therethrough;
   gantry means above said table including a removable gantry turret above said top surface of said table for reciprocal two-dimensional movement of said gantry means above said table;
   means for laterally adjustably dispensing a plurality of yarns from said gantry means on a substrate secured to the top surface of said table by said vacuum passages, said means for laterally adjustably dispensing a plurality of yarns including a glue bath for said plurality of yarns; and
   means for glue attachment of said yarns to said substrate on the top surface of said table.

15. The apparatus as defined in claim 14 and wherein said gantry means further includes a mountable pressure roller means.

\* \* \* \* \*